US012321855B2

(12) United States Patent
Bajic et al.

(10) Patent No.: US 12,321,855 B2
(45) Date of Patent: Jun. 3, 2025

(54) GRAPH EXECUTION USING ACCESS REQUEST RESPONSE DYNAMIC BATCH ASSEMBLY

(71) Applicant: Tenstorrent AI ULC, Toronto (CA)

(72) Inventors: Ljubisa Bajic, Toronto (CA); Davor Capalija, Toronto (CA); Ivan Matosevic, Toronto (CA); Alex Cejkov, Toronto (CA)

(73) Assignee: Tenstorrent AI ULC, Toronto (CA)

( * ) Notice: Subject to any disclaimer, the term of this patent is extended or adjusted under 35 U.S.C. 154(b) by 1088 days.

(21) Appl. No.: 17/221,469

(22) Filed: Apr. 2, 2021

(65) Prior Publication Data

US 2022/0318614 A1  Oct. 6, 2022

(51) Int. Cl.
| | | |
|---|---|---|
| G06F 9/44 | (2018.01) | |
| G06F 9/38 | (2018.01) | |
| G06F 9/48 | (2006.01) | |
| G06F 9/50 | (2006.01) | |
| G06F 18/20 | (2023.01) | |
| G06N 3/08 | (2023.01) | |
| G06N 5/04 | (2023.01) | |

(52) U.S. Cl.
CPC ............. *G06N 3/08* (2013.01); *G06F 9/3877* (2013.01); *G06F 9/4843* (2013.01); *G06F 9/5066* (2013.01); *G06F 18/29* (2023.01); *G06N 5/04* (2013.01); *G06F 2209/5019* (2013.01); *G06F 2209/502* (2013.01)

(58) Field of Classification Search
CPC ....................................................... G06N 3/08
USPC ........................................................ 718/106
See application file for complete search history.

(56) References Cited

U.S. PATENT DOCUMENTS

| 2019/0073580 A1 | 3/2019 | Dzhulgakov et al. |
| 2020/0234126 A1 | 7/2020 | Covell et al. |

OTHER PUBLICATIONS

Extended European Search Report from EP Application No. 22166213.3 dated Oct. 17, 2022, 13 pages.
Ranggi Hwang et al: "Centaur: A Chiplet-based, Hybrid Sparse-Dense Accelerator for Personalized Recommendations".
Gupta et al., "DeepRecSys: A System for Optimizing End-To-End At-scale Neural Recommendation Inference", arXiv:2001.02772, 14 pages.
Ke et al., "RecNMP: Accelerating Personalized Recommendation with Near-Memory Processing", arXiv:1912.12953, 14 pages.

(Continued)

*Primary Examiner* — Timothy A Mudrick
(74) *Attorney, Agent, or Firm* — Daylight Law, P.C.

(57) ABSTRACT

Methods and systems for the accelerated execution of a directed graph are disclosed. The execution can involve the generation of an inference from a set of inputs provided to an artificial neural network. In a specific example, a method for executing a directed graph includes receiving at least two batches of indices. The batches of indices, when used to access a set of embeddings, provide at least two batches of embedding outputs and execute a layer of the directed graph. The method further includes accessing the set of embeddings using the at least two batches of indices. The method further includes rearranging, based on a set of latencies for the accessing step, the at least two batches of embedding outputs into at least two batches of rearranged embeddings. The method further includes providing the at least two batches of rearranged embeddings to a subsequent layer of the directed graph.

21 Claims, 5 Drawing Sheets

(56) References Cited

OTHER PUBLICATIONS

Maxim Naumov, "On the Dimensionality of Embeddings for Sparse Features and Data", arXiv:1901.02103v1 [cs.LG], Jan. 7, 2019, 8 pages.
Maxim Naumov, et al., "Deep Learning Recommendation Model for Personalization and Recommendation Systems", arXiv:1906.00091v1 [cs.IR], May 31, 2019, 10 pages.
Oleksii Hrinchuk, et al., "Tensorized Embedding Layers", arXiv:1901.10787v2 [cs.CL], Feb. 19, 2020, 13 pages.

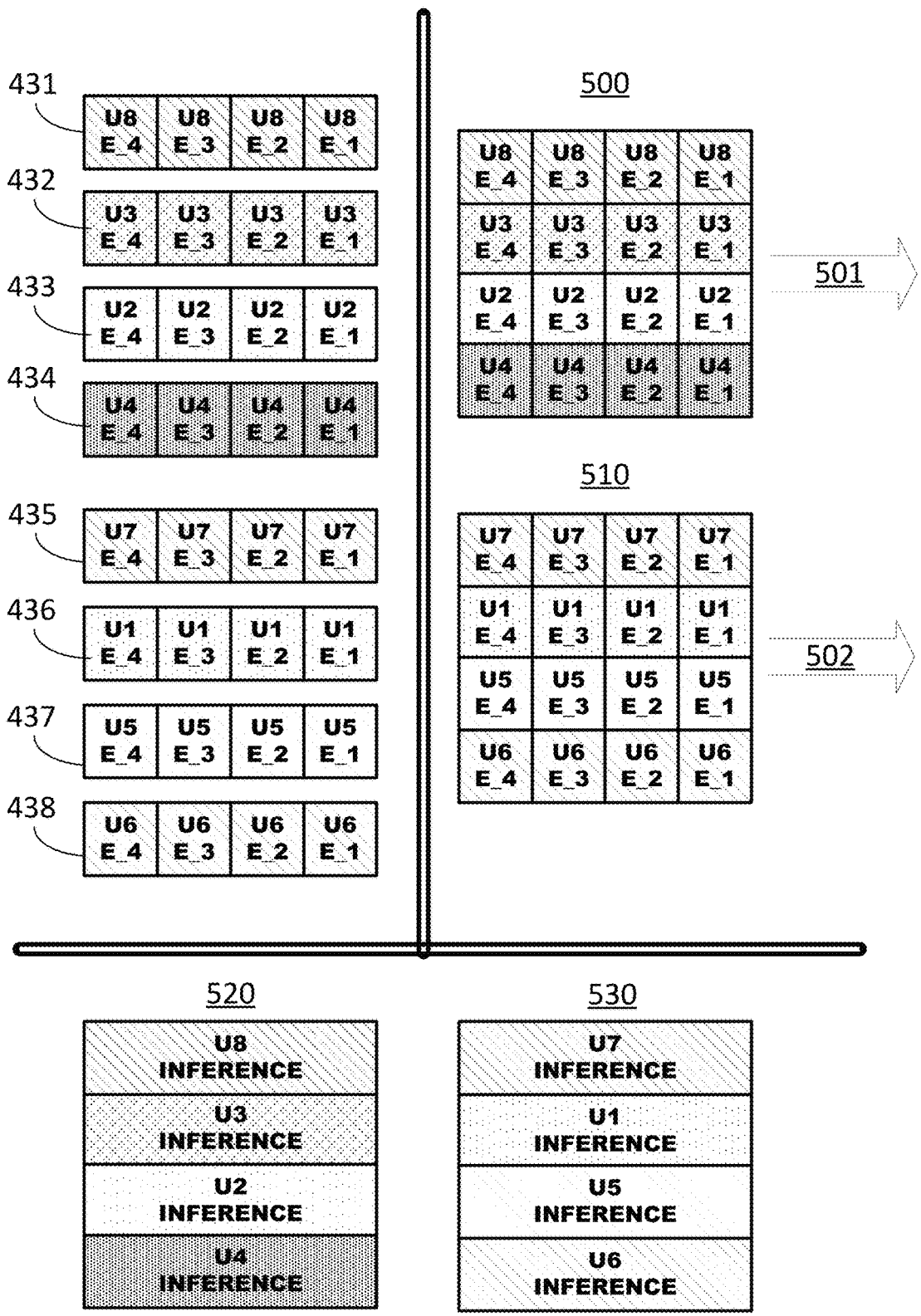

GRAPH EXECUTION USING ACCESS REQUEST RESPONSE DYNAMIC BATCH ASSEMBLY

BACKGROUND

The recent surge in the performance of machine intelligence systems is not due to the development of revolutionary new algorithms. Indeed, the core algorithms used in machine intelligence applications today stem from a body of work that is now over half a century old. Instead, it has been improvements in the hardware and software that implement machine intelligence algorithms in an efficient manner that has fueled the recent surge. Algorithms that were once too computationally intensive to implement in a useful manner with even the most sophisticated of computers can now be executed with specialized hardware on an individual user's smart phone. The improvements in hardware and software take various forms. For example, graphical processing units traditionally used to process the vectors used to render polygons for computer graphics have been repurposed in an efficient manner to manipulate the data elements used in machine intelligence processes. As another example, certain classes of hardware have been designed from the ground-up to implement machine intelligence algorithms by using specialized processing elements such as systolic arrays. Further advances have centered around using collections of transistors and memory elements to mimic, directly in hardware, the behavior of neurons in a traditional artificial neural network (ANN). There is no question that the field of machine intelligence has benefited greatly from these improvements. However, despite the intense interest directed to these approaches, machine intelligence systems still represent one of the most computationally and energy intensive computing applications of the modern age and present a field that is ripe for further advances.

The reason machine intelligence applications are so resource hungry is that the data structures being operated on are generally very large, and the number of discrete primitive computations that must be executed on each of the data structures are likewise immense. A traditional ANN takes in an input vector, conducts calculations using the input vector and a set of weight vectors, and produces an output vector. Each weight vector in the set of weight vectors is often referred to as a layer of the network, and the output of each layer serves as the input to the next layer. In a traditional network, the layers are fully connected, which requires every element of the input vector to be involved in a calculation with every element of the weight vector. Therefore, the number of calculations involved increases with a power law relationship to the size of each layer. Furthermore, this aspect of machine intelligence algorithms makes them difficult to parallelize because the calculations for each layer depend on the output of the prior layer.

The problems mentioned in the prior paragraph are further exacerbated by modern ANNs. Modern ANN approaches are often referred to in the industry and literature as "deep learning" approaches. This is often a reference to the substantial number of layers involved, or the complexity of the relationships between the outputs of one layer and the inputs of the other layers. For example, in a modern deep learning ANN, the outputs of a downstream layer could be fed back to a prior layer which thereby adds a recursive element to the overall computation. Both the increase in layers, and the additional complexity associated with recursive relationships between the layers, increase the computational resources needed to implement a modern ANN.

FIG. 1 illustrates a directed graph 100 for a movie recommendation engine. The execution of the directed graph requires inputs which include movies previously viewed by a user and an output which includes a recommended movie for the user to watch. The directed graph 100 is an ANN with an embedding portion 101 and a separate neural network portion 102. Embeddings are mathematical constructs described in the next paragraph. The embedding portion implements an embedding, but can otherwise have the same general composition as the neural network portion. The input to directed graph 100 included an input tensor X that encodes all the movies a particular user has watched, and an input tensor Y that encodes personal information regarding the user such as their age and country of residence. Input tensor X is provided to the embedding portion 101 while input tensor Y is provided to the separate neural network portion 102. The separate neural network portion 102 also receives the output of embedding portion 101. The output of directed graph 100 is an output tensor Z which encodes a movie recommendation for the user. The graph output can be referred to as an inference generated by the directed graph because the machine intelligence system is effectively inferring what the user would like to watch based on what they watched previously.

The edges of directed graph 100 represent calculations that must be conducted to execute the graph. The vertices in the directed graph form a set of layers which includes layers 103, 104, 105, and 106. In separate neural network portion 102, the calculations are multiplications between a set of weights and the values from the prior layer, and each edge is associated with a unique weight value that will be used in the calculation. For example, edge 114 represents a multiplication between weight $w_n$ and input value 115. The value of element 116 is the sum of a set of identical operations involving all the elements of layer 112 and a set of weight values that uniquely correspond to the origin vertex of each edge that leads to element 116. In embedding portion 101, the neural network 100 incorporates an embedding that groups movies identified in an input tensor X into a three-dimensional embedding space. The size of the N-dimensional space is set by the number of vertices in layer 103. The input tensor X is an extremely large tensor with a row for every movie known to the system. A "1" value in tensor X indicates the user has chosen to watch the movie and a "0" value indicates the user has never watched the movie. The execution of embedding portion 101 therefore involves accessing the embedding to obtain the three-dimensional values for each element with a "1" value in input tensor X. As used herein the term "embedding" refers to both the embedding space and the function that describe the relationship of the input values to their locations in that embedding space, while the term "accessing the embedding" refers to the action of obtaining a location in the embedding space given the input value. The input values can be referred to as "embedding inputs" and the locations in the N-dimensional embedding space can be referred to as the "embedding outputs." A traditional embedding space groups embedding inputs based on shared characteristics associated with each dimension associated with the embedding space. An intuitive example of the dimensions for an embedding space could include one dimension for a level of violence in the movie, one dimension for how old the move is, and one dimension could be the budget of the movie. Movies with proximate locations within the embedding space would therefore exhibit similar characteristics across that set of dimensions. In an ANN, the dimensions would not be as intuitive as in this example as the ANN would instead group the embedding inputs according to the best configuration required for the generation of accurate inferences by the ANN.

Execution of directed graph 100 involves many calculations by a computation engine and the numerous concomitant memory accesses required to obtain the values for those calculations from memory. In the illustration, dots are used in the vertical directions to indicate the large degree of repetition involved in the directed graph. Furthermore, directed graph 100 represents a relatively simply ANN, as modern ANNs can include far more layers with far more complex interrelationships between the layers. Additionally, in some modern ANNs the input vector X can be billions of units large (e.g., an encoding of every web page ever visited by a user as selected from all the known web pages on the World Wide Web). Although not illustrated by directed graph 100, the outputs of one layer can loop back to be the inputs of a prior layer to form what is often referred to as a recursive neural network (RNN). The high degree of flexibility afforded to a machine intelligence system by having numerous elements, along with an increase in the number of layers and complexity of their interrelationships, makes it unlikely that machine intelligence systems will decrease in complexity in the future.

SUMMARY

Methods and systems related to the field of accelerated execution of directed graphs are disclosed. Specific disclosed embodiments are related to the accelerated execution of a directed graph which involve the generation of an inference from a set of inputs provided to an artificial neural network (ANN). Specific disclosed embodiments are related to the accelerated execution of a directed graph by at least one processor or a network of computational nodes. In specific disclosed embodiments, the network of computational nodes includes a multicore processor where the computational nodes are processing cores in the multicore processor.

In specific embodiments of the invention, a method for executing a directed graph is provided. The method comprises receiving at least two batches of indices. The batches of indices can be used to execute a layer of the directed graph when used to access a set of embeddings. The batches of indices can be used to provide at least two batches of embedding outputs which correspond to the at least two batches of indices when used to access the set of embeddings. The method further comprises accessing the set of embeddings using the at least two batches of indices. The method further comprises rearranging, based on a set of latencies for the accessing step, the at least two batches of embedding outputs into at least two batches of rearranged embedding outputs. The method further comprises providing the at least two batches of rearranged embedding outputs to a subsequent layer of the directed graph.

In specific embodiments of the invention, a method for executing a directed graph is provided. The method comprises receiving at least two batches of indices. The at least two batches of indices, when used to access a set of embeddings: provide at least two batches of embedding outputs which correspond to the at least two batches of indices; and execute a layer of the directed graph. The method also comprises accessing the set of embeddings, using the at least two batches of indices. The accessing of the set of embeddings includes individually providing a sequence of embedding outputs from a memory to a computational node. The method also comprises rearranging, based on the sequence of embedding outputs, the at least two batches of embedding outputs into at least two batches of rearranged embedding outputs. The method also comprises providing the at least two batches of rearranged embedding outputs to a subsequent layer of the directed graph.

In specific embodiments of the invention, a system for executing a directed graph is provided. The system comprises a network of computational nodes. The system also comprises a first computational node in the network of computational nodes. The system also comprises a second computational node in the network of computational. The system also comprises non-transitory computer readable media, in the network of computational nodes, storing instructions which, when executed by the network of computational nodes, cause: (i) the first computational node to receive at least two batches of indices, wherein the at least two batches of indices, when used to access a set of embeddings: provide at least two batches of embedding outputs which correspond to the at least two batches of indices; and execute a layer of the directed graph; (ii) the first computational node and at least the second computational node to cooperatively access the set of embeddings using the at least two batches of indices; (iii) the first computational node to rearrange, based on a set of latencies for the accessing step, the at least two batches of embedding outputs into at least two batches of rearranged embedding outputs; and (iv) the first computational node to provide the at least two batches of rearranged embedding outputs to a subsequent layer of the directed graph.

BRIEF DESCRIPTION OF THE DRAWINGS

FIG. 5 illustrates a data flow diagram of a second set of steps in the flow chart of FIG. 3 in accordance with specific embodiments of the invention disclosed herein.

DETAILED DESCRIPTION

Methods and systems related to the field of accelerated execution of directed graphs in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 2:
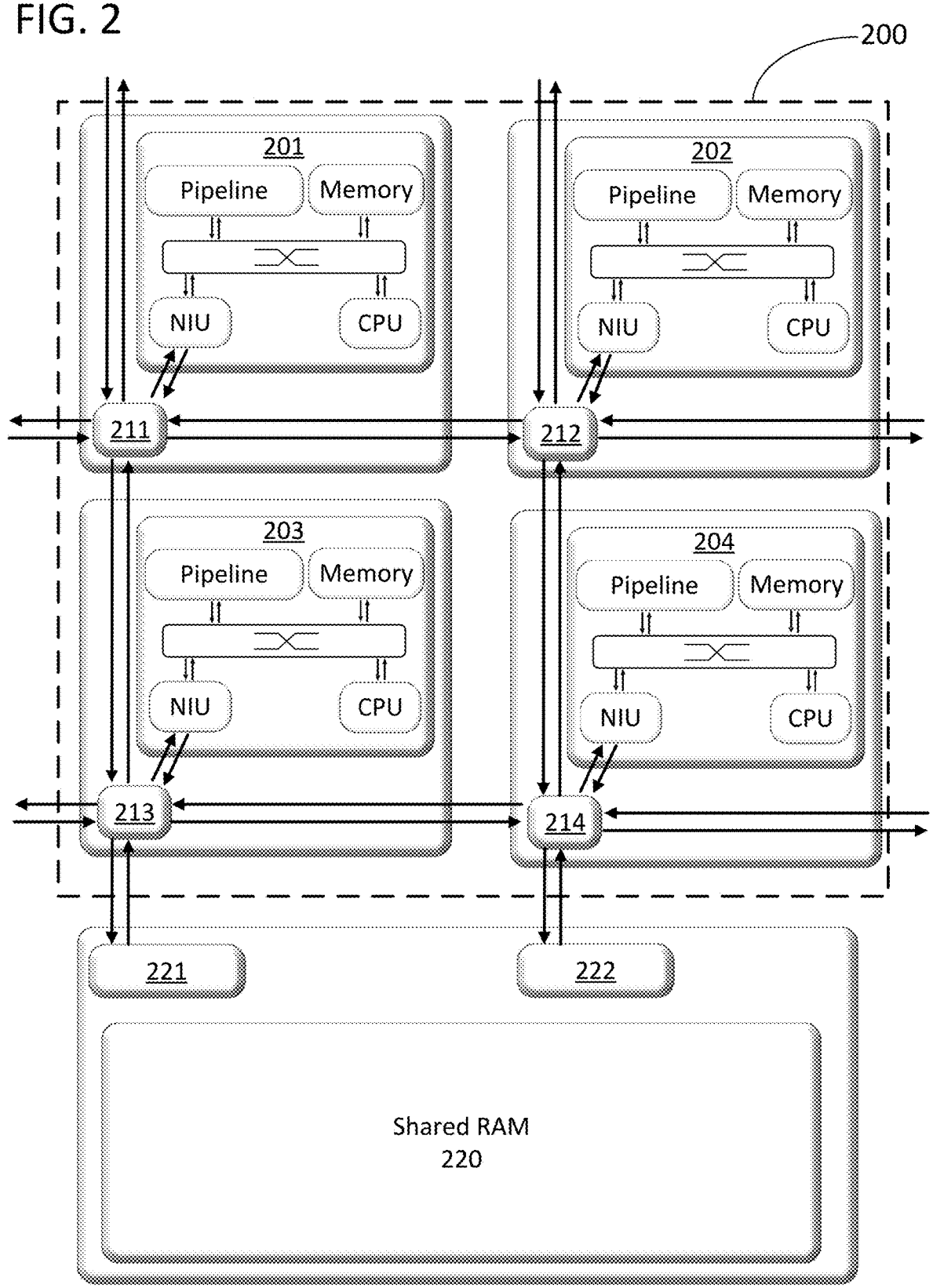
FIG. 2 illustrates a system for executing a directed graph in accordance with specific embodiments of the invention disclosed herein.

A system for executing a directed graph in accordance with specific embodiments of the invention can include a network of computational nodes. FIG. 2 includes a block diagram of a system for executing a directed graph in accordance with specific embodiments of the present invention. FIG. 2 includes a network of computational nodes 200 including various processing cores 201, 202, 203, and 204 for the parallel execution of a complex computation in accordance with the field of parallel computing and multi-core processors. Each processing core can be connected to the network via a dedicated router. When the processing cores are located on a single chip, the network can be referred to as a network-on-chip (NoC).

A system for executing a directed graph in accordance with specific embodiments of the invention can include computational nodes of various forms. FIG. 2 includes a first computational node in the network of computational nodes, in the form of a first processing core 201 in the multicore processor, and a second computational node in the network of computational nodes, in the form of a second processing core 202 in the multicore processor. The system also includes a third processing computational node in the network of computational nodes, in the form of a third processing core 203 in the multicore processor as well as a fourth processing core 204. The computational nodes can include any form of computation engine including arithmetic logic units, floating point units, and various forms of fundamental computation units and processing pipelines. The computational nodes can also include hardware and associated firmware or software for communicating with the network.

In specific embodiments the computational nodes can include various elements. The computational nodes could include a computation pipeline, a memory, a bus, and a network interface unit. Each computational node could also include a local controller. The memory could be a cache memory of the processing core such as a random-access volatile memory such as an SRAM. The computational nodes could also include additional or more specific elements such as a higher-level controller, serializer/de-serializer, nonvolatile memory for modifiable configuration information, and any number of arithmetic logic units and other fundamental computation units. If the computational nodes are processing cores, the local controller could be a core controller to coordinate or execute operations within the core. In specific embodiments, the core controller can be a dedicated Central Processing Unit (CPU). In either case, the core controller or CPU can administrate the transfer of data to a main processing pipeline of the processing core. If the computational nodes are processing cores, the processing pipeline of a node can be the main computation pipeline of a processing core and the associated memory can be the main memory of the processing core such as a cache of the processing core. The processing pipelines can be used to execute component computations required for the computation network to execute a composite computation. The network of computational nodes can include routers on each of the computational nodes and a system of buses that either solely connect adjacent computational nodes for facilitating multi-hop communications or also connect distal computational nodes facilitating single-hop communications between those distal computational nodes. In the illustrated case, each processing core in network of computational nodes 200 includes a computation pipeline, a memory, a bus, a network interface unit and a controller in the form of a central processing unit. Each computational node in the network of computational nodes 200 also includes a router 211, 212, 213, and 214 to allow the associated computational node to communicate with other computational nodes and external systems.

Although some of the specific examples provided in this section are directed to a network of computational nodes in the form of a NoC connecting a set of processing cores, the approaches disclosed herein are broadly applicable to networks connecting any form of computational nodes. Furthermore, networks in accordance with this disclosure can be implemented on a single chip system, including wafer-scale single chip systems, in a multichip single package system, or in a multichip multipackage system in which the chips are commonly attached to a common substrate such as a printed circuit board (PCB), interposer, or silicon mesh. Networks in accordance with this disclosure can also include chips on multiple substrates linked together by a higher-level common substrate such as in the case of multiple PCBs each with a set of chips where the multiple PCBs are fixed to a common backplane. Networks in accordance with this disclosure can also be implemented in chiplet based systems. For example, in specific embodiments of the invention, one or more computational nodes could be housed or implemented by one or more chiplets, connected, for example, through an interposer.

A system for executing a direct graph can also include at least one processor and non-transitory computer readable media. The at least one processor could comprise at least one computational node in a network of computational nodes. The media could include cache memories on the computational nodes such as first processing core 201 and second processing core 203. The media can also include shared memories that are not associated with a unique computational node. In network of computational nodes 200, the shared memory 220 is a shared random-access memory and could be, for example, a DDR4 DRAM. The shared memory can be accessed by multiple channels such as channel 221 and 222. The non-transitory computer readable media can store data required for the execution of a directed graph by the system, instructions on how the directed graph should be executed, and instructions on how the data and instructions should be distributed amongst the computational nodes. The computer readable media can also store instruction which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

In specific embodiments of the invention, systems such as those represented by FIG. 2 can be utilized to execute the methods disclosed herein. However, the methods disclosed herein can be executed by alternative computing systems and do not necessarily require the use of a network of computational nodes. Indeed, the disclosed methods can efficiently execute a directed graph using a computational system with a single computation pipeline. For example, the methods could be executed by a standard processor and memory that has been augmented to include a cache management system that can dynamically rearrange batches of memory lookup request responses, as they are received, for return to the computation pipeline of the processor.

Figure 3:
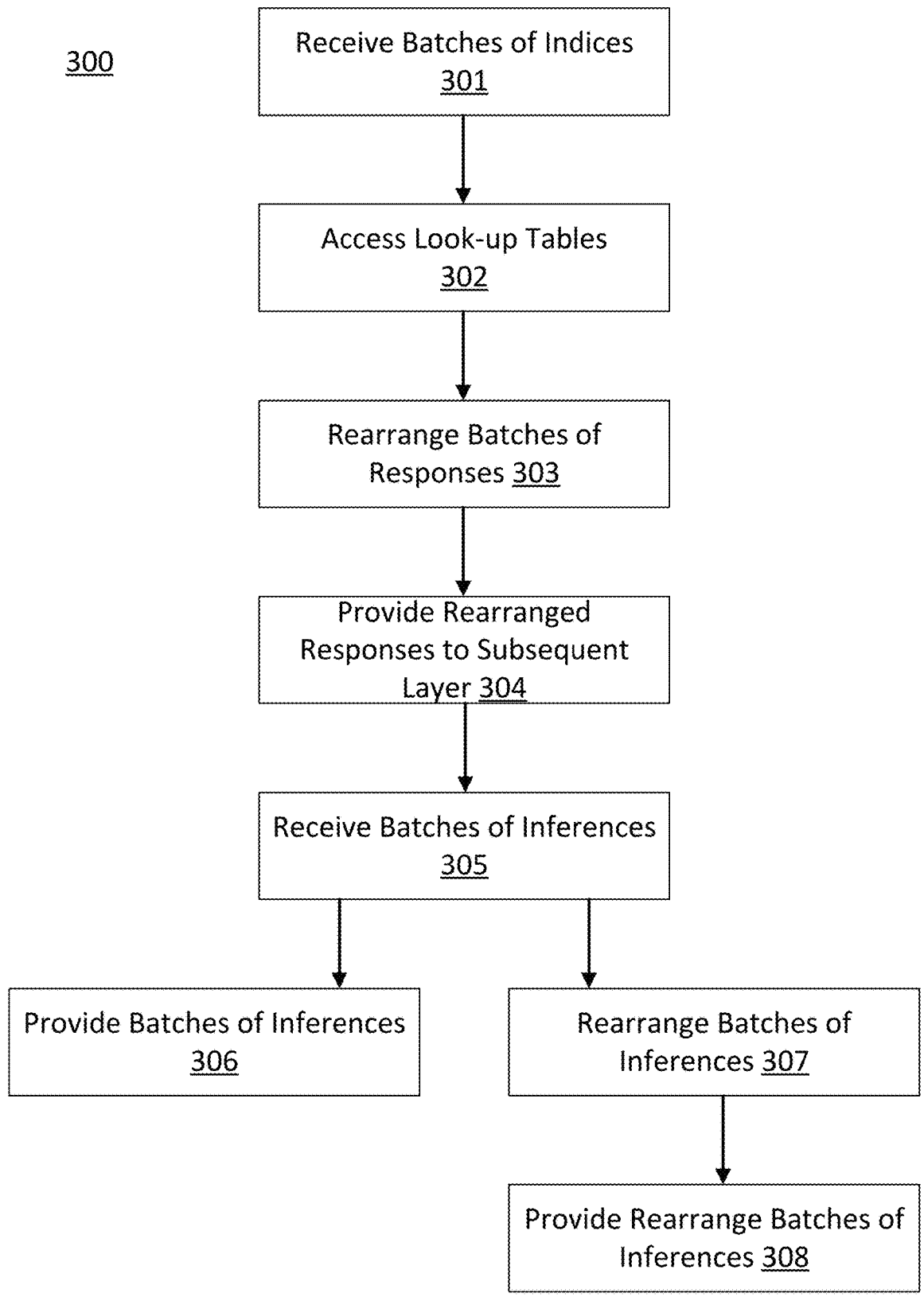
FIG. 3 illustrates a flow chart for a set of methods for executing a directed graph in accordance with specific embodiments of the invention disclosed herein.

FIG. 3 includes a flow chart 300 for a set of methods for executing a directed graph in accordance with specific embodiments of the present invention. Each step in the set of methods illustrated by flow chart 300 can be executed by a computational system such as a single processor. Instructions for executing the steps of the flow chart can be stored on non-transitory computer readable media accessible to the single processor. The set of methods illustrated by flow chart 300 can be executed by various computational systems such as and the systems represented by FIG. 2. Indeed, the computer-readable media mentioned with respect to FIG. 2 can include instructions that cause the systems of FIG. 2 to execute the methods represented by flow chart 300. In specific embodiments, the set of methods illustrated by flow chart 300 can be used to accelerate the execution of a directed graph as compared to a standard execution of the same directed graph. These methods can involve the use of dynamic batch assembly of access request responses as described below.

In specific embodiments of the invention, access request responses in the disclosed computational systems can be responses to requests to a memory of the computational system. The memory can be a hierarchical memory. The memory hierarchy can include a cache memory (such as a local SRAM memory), a separate random-access memory (such as an external DRAM memory), a separate nonvolatile memory (such as a flash memory), and additional hierarchical levels. In specific embodiments of the invention, such as those in accordance with the systems of FIG. 2, the various levels of the hierarchy can be provided by different computational nodes in the network of computational nodes. For example, second computational node 202 can provide a service to the remainder of the network and serve as a storage location for large data structures that are required by the remainder of the network. As such, the second computational node 202 can serve as a second layer of a memory hierarchy for an alternative node in the network, where that alternative node's local cache memory is the first layer of the memory hierarchy. In this same example, the shared memory 220 could serve as a third layer of the memory hierarchy. Note that in this example, the levels of the hierarchy follow the classic characteristic of memory hierarchies in that accessing the cache memory of another computational node is slower that accessing a local SRAM, but faster than accessing a standard DRAM through the network.

In specific embodiments of the invention in which the computational system includes multiple computational nodes, access requests can be conducted cooperatively by those various computational nodes. The nodes can be specialized nodes designed to handle specific aspects of the access requests, and other aspects of the execution of a directed graph. The nodes can also be generalized nodes that can be configured to handle specific aspects of the access requests, and other aspects of the execution of the directed graph, such as via the provisioning of instructions to the computational nodes. For example, one node may be designed or configured to conduct calculations for the execution of the directed graph, one node may be designed or configured to process the access requests and provide the access requests response to the appropriate computational node, and one node may be designed or configured to store the data identified by the access request and provide that data in response to receiving an access request message from separate node. In keeping with this example, in FIG. 2 node 201 could be a generic processing core that has been augmented, through the delivery of instructions to the memory of the processing core, to process access requests. In embodiments in which the access requests are embedding access requests, node 201 could be referred to as an embedding look up orchestrator core. The general action of the embedding look-up orchestrator core would involve receiving an embedding input (e.g., an index in a set of indices) and then servicing the request from local memory or delivering the requests to an alternative computational node or shared memory. In keeping with this example, in FIG. 2 node 202 could be a generic processing core that has been augmented, through the delivery of instructions to the memory of the processing core, to receive access requests and return access request responses (e.g., embedding outputs) in response thereto. In embodiments in which access request are delivered to an alternative computational node from an embedding look up orchestrator core, the computational node could be an embedding cache core which stores embeddings in association with indices and is configured to provide a cache service for those requests by minimizing the expected access time of requests sent to the core. Accordingly, node 201 and 202 could cooperatively process an access request (e.g., access an embedding) with node 201 sending the request to node 202 and waiting for a response.

Directed graphs executed using the methods of flow chart 300 can exhibit certain characteristics. In particular, the directed graphs can include a section which requires access requests for large data structures followed by a separate section. For example, the directed graphs could include an embedding portion with an embedding having a large number of potential inputs. In these examples, each potential input to the embedding could be associated with an N-dimensional embedding output that needs to be accessed from a look-up table with individual entries for every potential input. In these examples, the access requests are embedding access, the indices are the embedding inputs, and the access request responses are embedding outputs. Considering the example of an embedding for a recommendation engine where the potential embedding inputs are the more than 5.5 billion web pages on the World Wide Web, it is possible to understand why the embedding can be such a large data structure. In alternative embodiments, the directed graphs can include any section which requires access requests for large data structures and is followed by a separate portion that cannot begin to execute computations until the values from the large data structure have been accessed.

Figure 1:
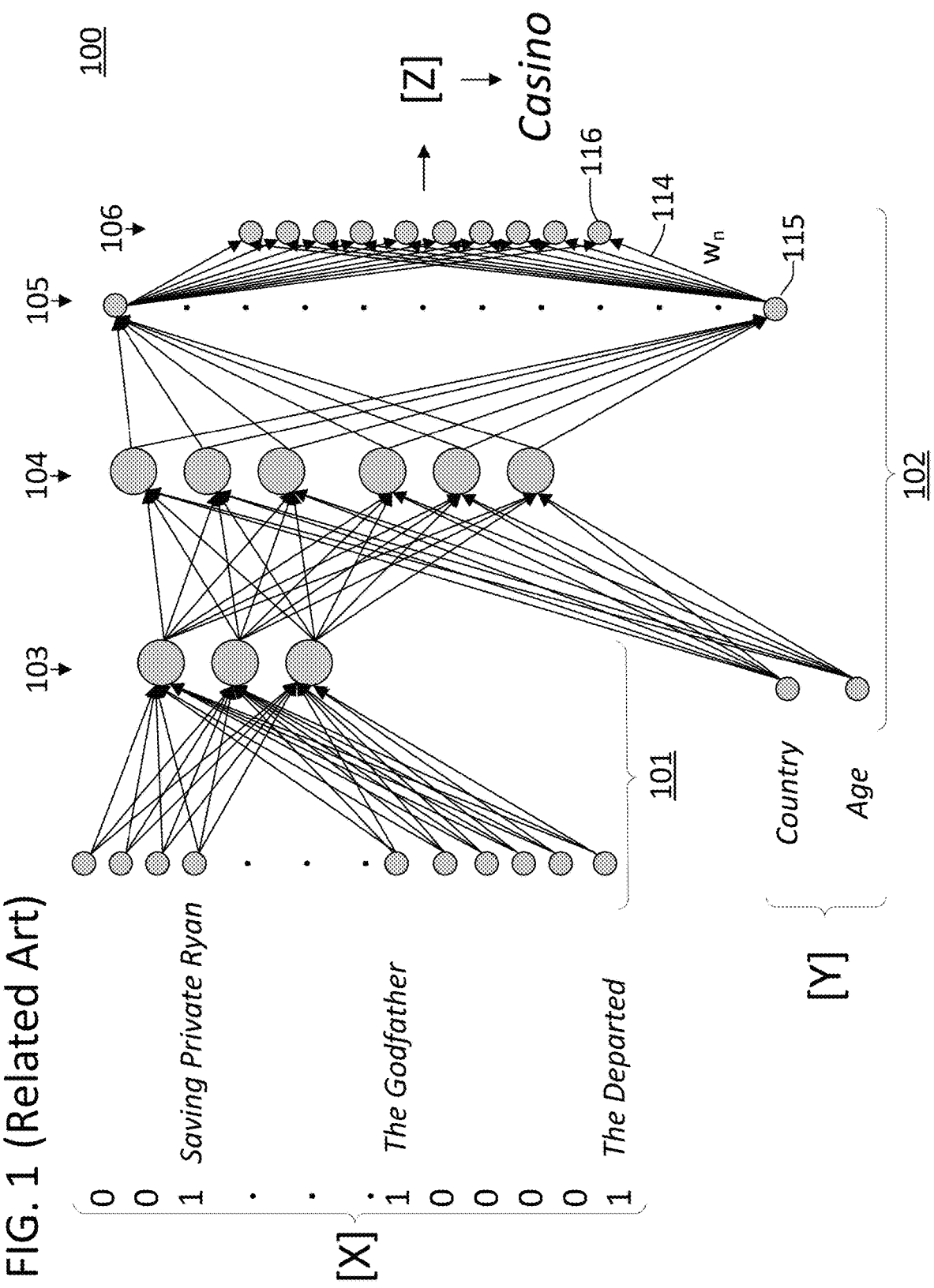
FIG. 1 illustrates a directed graph for a movie recommendation engine in accordance with the related art.

Directed graphs executed using the methods of flow chart 300 can also be designed for batched inputs. The batches can include sets of inputs that are each specific to a given inference such that the application of a batch to the directed graph, as an input, will produce a set of outputs which are associated with the set of inputs in a one-to-one correspondence. The sets of inputs in a given input are not necessarily logically associated, and indeed in many cases do not have to be. Referring back to the example in FIG. 1, the batch could include a set of the illustrated X vectors for different users combined into a vector X', and the graph could be designed to receive the entire vector X' as an input at one time. The various elements of the vector X can be referred to as inputs, and the vector X can be referred to as a "set of inputs." The entire vector X' can then be referred to as a batch of inputs or a batch of sets of inputs. The output of the directed graph in response to the batch of inputs X' would then be a set of movie recommendations for those individual users. The reason directed graphs are sometimes configured in this manner is the time associated with pulling all the weights of a given layer from memory and the relative speed at which the weights can be accessed from memory and the speed at which the computations involving those weights can be executed. Generally, the weight values of a given layer are used in a large number of computations, the number of which increases with the number of inputs to the layer. This is beneficial because the time spent to retrieve the weight value from memory can be conceptualized as overhead which is shared by the number of computations executed using that weight value. This benefit can be improved accordingly by increasing the size of the input (e.g., by batching the input vectors into a matrix of inputs). To use a specific example for purposes of explanation only, an accelerator for the execution of a directed graph in the form of an artificial neural network could have a 100 gigabyte per second (GB/s) memory interface and a computation pipeline capable of executing 100 terra-multiplications per second (TM/s). Accordingly, to balance the memory access time and the computation time, a designer could attempt to assure that each number retrieved from memory should be reused 100 times. If a single vector of 10 user values is applied to a network, the weight values will only be reused 10 times. Accordingly, the designer would choose to have 10 sets of user values batched into a matrix of inputs.

The example provided above with the vector X' is an example of a batch of numerous user-specific sets of inputs including X. More generally, any set of inputs that will be used to generate a separatable and associated inference as an output can be referred to as an inference-specific set of inputs.

Flow chart 300 beings with a step 301 of receiving at least two batches of indices. The at least two batches of indices can be used in access requests to access data in a set of tables required to execute a directed graph. For example, the indices could be used to access a set of embeddings for executing an embedding portion of a directed graph. The number of indices in each batch can be set by the characteristics of the directed graph where the directed graph is designed to accept a batch of indices as an input in parallel. The size of each batch can be set to an input size for a directed graph or a portion of a directed graph. For example, the batch could have a number of indices required to access all of the embeddings needed to execute an input layer of an embedding portion of a directed graph. As such, in the example of a directed graph including an embedding portion, the at least two batches of indices would be used to access an embedding and provide at least two batches of embedding outputs which correspond to the at least two batches of indices. In this way, the at least two batches of indices would be used to execute a layer of the directed graph.

The receiving in step 301 can be conducted in various ways. For example, the batches of indices could be retrieved from memory by a computational node in a network of computational nodes. Alternatively, the network of computational nodes could receive the batch of indices from an external network connection. These two types of examples can be explained more specifically with reference to FIG. 2. The batches of indices could be received by a first computational node such as computational node 201. The batches could be retrieved from local memory on computational node 201 or pulled from shared memory 220 to be operated upon by computational node 201. Computational node 201 can be configured to execute a directed graph and receive the batches of indices in response to a command to execute the directed graph with respect to that particular set of indices. The command can be issued by an external controller which is utilizing network of computational nodes 200 to execute the directed graph. The command can also be an instruction which has already been compiled for execution by the network of computational nodes 200 and embedded therein such as a set of instructions stored on the CPU of computational node 201. Alternatively, first computational node 201 could be an embedding look up orchestrator node. In embodiments in which the computational nodes are processing cores, the core computational node could be an embedding lookup orchestrator core. The embedding lookup orchestrator node could be specifically programmed to administrate embedding accesses by receiving embedding inputs, orchestrating the accessing of the embedding, and providing the embedding outputs in response. For example, computational node 201 could receive the indices, and service the embedding request by first checking a local memory (potentially keeping track of where to search on alternative cores or external memories for the embedding outputs) and sending the access requests to alternative cores or external memories if the values are not locally available. Such an approach would be important if the embeddings were large enough to not fit on the memory of a single processing core. The network of computational nodes could be designed such that the cache memories of multiple processing cores stored a single embedding, and an embedding lookup orchestrator core would access those multiple cache memories to service an embedding access request. In specific embodiments, the multiple cache memories could be provided by other computational nodes that form a set of embedding cache cores which store embedding outputs in association with indices.

Flow chart 300 continues with a step 302 of accessing the set of lookup tables using the at least two batches of indices received in step 301. In specific embodiments, this step can be conducted using a set of access requests which include the indices from the at least two batches of indices and waiting for a response from memory which includes the entries in the set of lookup tables that correspond to the indices. In specific embodiments, the set of lookup tables are embeddings and the step involves accessing a set of embeddings using at least two batches of indices where the indices are embedding inputs. This step could be conducted as part of the execution of a layer of an embedding portion of the directed graph.

The accessing in step 302 can be conducted in various ways. In specific embodiments of the invention, the accessing of the embedding could be orchestrated by a first computational node accessing an external memory via the network of computational nodes. Returning to the example of an embedding orchestrator node, the orchestrator node could be first computational node 201 in FIG. 2. The accessing would thereby involve sending out access requests from the first computational node 201 to other computational nodes in the network of computational nodes which were storing the required tables such as at least second computational node 202. The second computational node 202 could be an embedding table cache node which stores embeddings in association with the indices on behalf of the embedding orchestrator node. The accessing would also involve the act, on the part of the first computational node 201, of waiting for a response from the access request while the network obtained the requested data. In this example, the first computational node, since it does not have direct access on its local memory to every embedding output associated with the indices received in step 301, could be said to be cooperatively accessing the embedding in association with the other computational nodes, such as second computational node 202.

In specific embodiments of the invention, the access requests will be associated with varying latencies in a manner which is difficult to predict ex ante. In other words, different received indices will result in access requests with different durations. To return to the example of FIG. 2, one index received at computational node 201 might result in an access request that can be serviced locally by a memory on computational node 201, a second index received at computational node 201 might result in an access requests that must be serviced remotely on second computational node 202, while a third index received at computational node 201 might result in an access request that can only be serviced by shared memory 220. As each of these indexes are associated with a different level of the memory hierarchy, it will take varying amounts of time for the access requests to be serviced. In embodiments in which the indexes are received in a batch, there could be a high degree of variability across a single batch in terms of the amount of time required to service the request and provide a response. For example, if the indexes mentioned above were all part of a batch of embedding inputs, all the embedding outputs for that batch would be serviced at different times even if they were all requested in parallel by computational node 201. As a result, a corresponding batch of embedding outputs could not be reassembled until all the responses were received.

Flow chart 300 continues with a step 303 of rearranging the at least two batches of access request responses into at least two batches of rearranged access request response. Returning to the example of FIG. 2, this step could be conducted by computational node 201 as the access request responses were received. For example, the access request responses could be the embedding outputs described above. The at least two batches of access request responses can be rearranged in that the batches of access requests responses no longer correspond to the batches of access requests. Instead, access request responses to access requests from multiple batches would be combined into a single batch of access requests on a first-returned-first-batched basis. As such, the rearranging is therefore a rearrangement from the expected content of batches that would have occurred if the responses to the access requests were kept together in the same batches as their corresponding access requests.

The rearranging in step 303 can be conducted based on various factors. The arranging can be based on a set of latencies of the look up table accessing step 302. For example, the arranging can be based on the set of latencies in that the rearranged embedding output batches are formed dynamically as individual entries in the set of embedding outputs are accessed. As another example, the rearranging can be based on combining the access request responses that are first to return in response to the requests. The point at which the requests are received for purposes of creating this new ordering can be a computational node that is orchestrating the access requests. In other words, the accessing step can include individually providing a sequence of access request responses from a memory to a computational node, and the rearranging can be based on the sequence of access request responses being received at the computational node. Returning to the example of FIG. 2, the rearranging can involve first computational node 201 placing access request responses into batches as soon as they are received from local memory or from external memories regardless of the order in which the associated access requests were initially sent. The rearranging can be based on the set of latencies using estimates of the latencies. The estimates of the latencies are stored prior to the execution of the accessing the set of embeddings step. Returning to the example of FIG. 2, the rearranging can involve first computational node 201 storing a data table that groups indexes into groups based on a recorded latency of closely associated access requests and use the data table to prioritize access requests that are likely to be quickly serviced. The responses to those access requests can then be dynamically batched as they are received. In another related example, the rearranging can involve first computational node 201 storing a data table or recently accessed indexes and can estimate the latency based on how recently the index was accessed with the most recent being assumed to have the lowest latency because the cache manager will have brought them up in the hierarchy. Related methods can use additional knowledge regarding the operation of the cache and memory hierarchy to estimate the latencies. In specific embodiments, the rearranging can also take into account a priority associated with a given inference-specific input and prioritize batching the access response for that specific input. The prioritization could be taken into account at the time of dynamic formation of the batches with a minimum quota of priority responses required for each batch or a time delay applied to all non-priority responses before they are considered for inclusion in a batch.

Flow chart 300 continues with a step 304 of providing the at least two batches of rearranged access responses to a subsequent layer of a directed graph. In specific embodiments, this step can involve providing rearranged batches of embedding outputs to a separate portion of a directed graph. Returning to the example of FIG. 2, this step can involve first computational node 201 providing at least two batches of rearranged embedding outputs to a subsequent layer of the directed graph by making the values available for further computation on the computational node, or by forwarding them to the computational node that initially provided the indices. The at least two batches of inputs can be provided to the subsequent layer of the directed graph as they are assembled. For example, once first computational node 201 has received enough sets of access request responses to form a complete batch that is equal in size to the input of the subsequent layer of the directed graph, the first computational node 201 can send the assembled batch to that subsequent layer by either doing the computation locally or assuring that an alternative computational node can do so. Specific benefits accrue to this approach in that the computation of the subsequent layer of the directed graph can commence earlier than would otherwise be available if the original batch needed to be fully assembled before being forwarded. In the context of parallel computation this is particularly advantageous in that, if it is not done, portions of the parallel computation system remain idle.

In specific embodiments of the invention, each batch of indices received in step 301 is nominally associated with a single execution of a directed graph. However, as content of each batch through the directed graph is rearranged, the same batch can end up being associated with different executions. A directed graph can include an embedding layer that is executed during step 302 and 303, and a separate portion that is executed during steps 304 and 305. The embedding layer in that case will be executed a number of times equal to the number of batches in the at least two batches of indices (e.g., embedding inputs) which are received in step 301. In this same example, the providing of the at least two batches of rearranged access responses (e.g., embedding outputs) to the subsequent layer of the directed graph step is conducted the same number of times. However, an index (e.g., embedding input) in a first batch during the execution of steps 302 and 303 may be reordered and grouped with a different batch of access responses (e.g., embedding outputs) that are not associated with the other indices in that first batch during the execution of steps 304 and 305.

Flow chart 300 continues with a step 305 of receiving at least two batches of inferences from an output layer of a directed graph in response to the providing of the at least two batches of rearranged embeddings to the subsequent layer of the directed graph in step 304. The step can be the final step in the execution of the directed graph using the rearranged batches of embedding inputs. The step can be conducted by a single computational node in the network of computational nodes receiving the outputs from its own computational pipeline or from one or more different computational nodes that have executed the directed graph. Step 305 can then be followed by a step 306 of providing the at least two batches of inferences. The step can involve providing the inferences to a different computational node or to an external system. The batches received will be out of order as compared to the original inputs provided to the directed graph. In an alternative embodiment the flow chart can continue with a step 307 of rearranging the at least two batches of inferences, based on an original composition of the at least two batches of indices, into at least two batches of rearranged inferences. Step 307 can then be followed by a step 308 of providing a rearranged batch of inferences. In embodiments in which the flow chart is executed using a network of computational nodes, step 308 can involve providing the rearranged batches of inferences to a different computational node or to an external system. The first option of following step 306 provides the benefit of reducing the latency of the overall process. However, the system which initially provided the batches will need to be made aware of the rearrangement which can be provided by separately keeping track of the concordance of the generated inferences and the original inputs within the batch. The second option of following step 307 and 308 may seem, at first glance, to counteract all the benefits of accelerating the processing of sets of inputs that do not have long memory access times. However, the second option still has the benefit of assuring that subsequent layers of the directed graph which operate on the rearranged batches produced in step 304 begin execution more rapidly and any associated hardware does not remain idle at that time.

Figure 4:
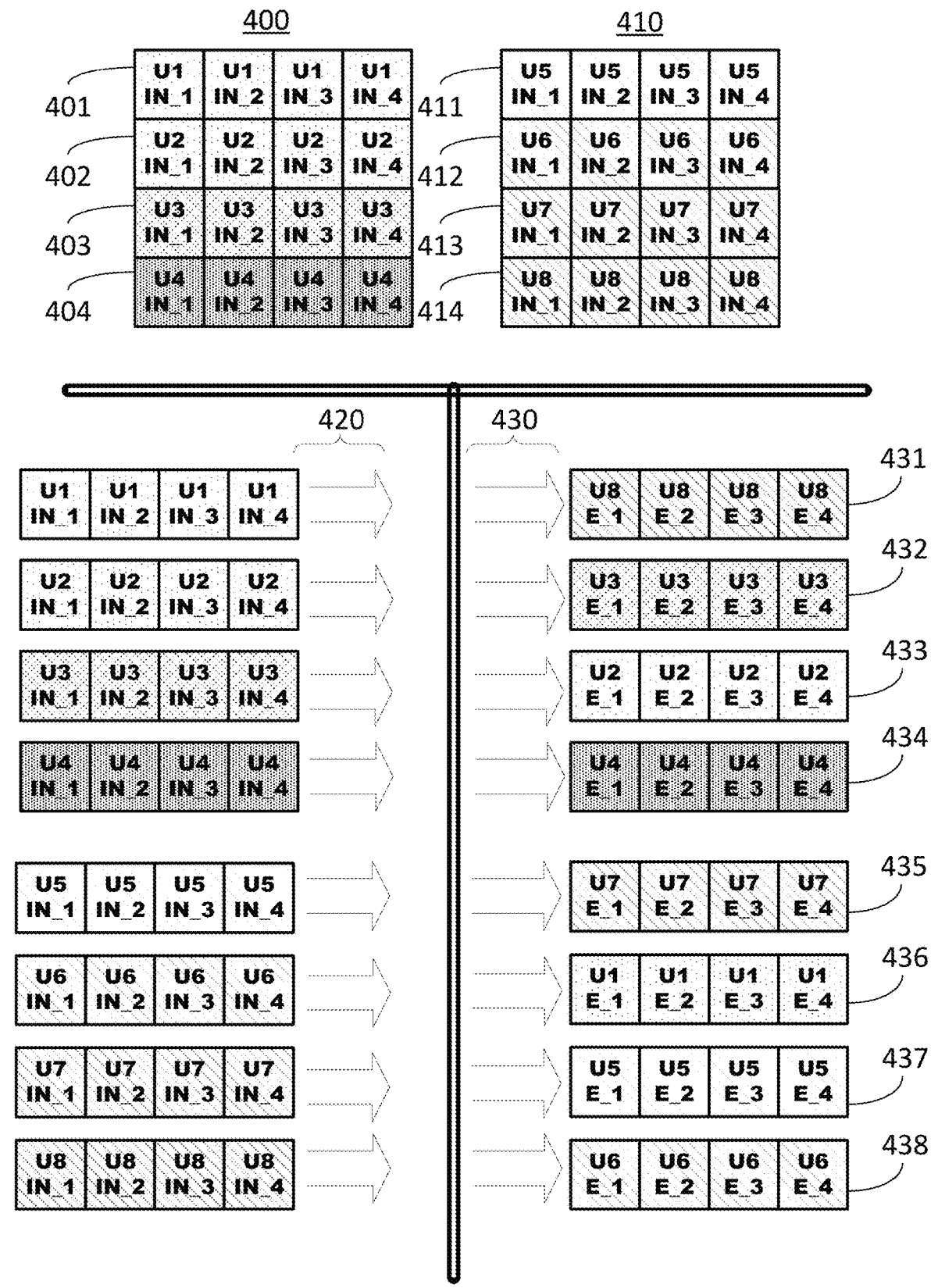
FIG. 4 illustrates a data flow diagram of a first set of steps in the flow chart of FIG. 3 in accordance with specific embodiments of the invention disclosed herein.

In specific embodiments of the invention, the directed graph can be a deep learning recommendation engine. In these embodiments, the batches in the at least two batches of indices which are received as inputs to the system can include at least two user-specific sets of indices. FIG. 4 illustrates two batches 400 and 410 each with four user-specific sets of indices. Batch 400 includes user specific set of indices 401 as well as 402, 403, and 404. Batch 410 includes user specific set of indices 411 as well as 412, 413, and 414. The sets of indices are labeled according to the user they are associated with from a set of users 1 through 8 (i.e., U1 through U8). The indices can be embedding inputs. For example, the indices could be encodings for a set of four "1" values from a large vector such as X (i.e., each entry IN_1 to IN_4 could be a value from 1 to the size of the vector X). In contrast to the example of FIG. 1, batches 400 and 410 are meant to be used with a directed graph that can accept an entire batch of indices as an input for one execution of the directed graph (i.e., batch 400 represents one simultaneous input to the directed graph and batch 410 represents one separate simultaneous input to the directed graph). As such, each batch in the set of at least two batches of indices comprising batch 400 and 410 includes four inference-specific sets of indices (e.g., 401, 402, 403, and 404 for batch 400). The inference-specific sets of indices are also user-specific sets of indices in this particular case.

FIG. 4 illustrates how the batches of indices can be used to execute an embedding portion of a directed graph by being used for a set of access requests 420. In this example, the access requests are memory requests to obtain embedding outputs that correspond to the access requests. The access requests could be conducted as part of step 302 in FIG. 3. FIG. 4 also illustrates the access responses 430 which are presented chronologically on the page from top to bottom. The access requests responses 430 could be conducted as part of both steps 302 and 303 in FIG. 3 in that the chronological order in which the responses are received can be used to dynamically rearrange the batches. As seen in the figure, the order of the memory access request response 430 provides a set of embedding outputs 431, 432, 433, 434, 435, 436, 437, and 438 that do not correspond to the order in which the access requests were sent. For example, the set of embedding outputs 431 correspond to user 8 as associated to set of indices 414. The memory access request for set of embedding outputs 431 was therefore of much lower latency than that for the set of embedding outputs 436 corresponding to user 1.

FIG. 5 illustrates how the sets of embedding outputs can be reassembled into batches of rearranged embedding outputs. As seen in FIG. 5, the embedding outputs were dynamically reassembled into batches 500 and 510 based on when the access request response was completely serviced. As illustrated, the batches 500 and 510 of rearranged embeddings each include four inference-specific sets of embedding outputs. These batches can then be provided to subsequent layers of the directed graph using operations 501 and 502. The results of the execution of the remaining layers of the directed graph in operations 501 and 502 being executed are batches of inferences 520 and 530 respectively. Notably, the first set of inferences in batch 520 as generated from the at least two inference-specific sets of indices is not equal to a second set of inferences that would have been generated had the users in batch 400 been kept in the same batch through the complete execution of the directed graph. However, both batches would have had to wait to conduct the equivalent operations to operations until embedding output 436 for user 1 had been serviced. As a result, the hardware associated with the downstream portions of the directed graph in operations 501 and 502 would remain idle wasting computation resource capacity as well as delaying the generation of inferences by the directed graph.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, although the examples in the disclosure refer mainly to computational nodes that are cores in a multicore processor, computational nodes can be general processing cores, graphics processors, neural network accelerators or any other computational node used in the parallel execution of complex computations. Although the example of the accelerated execution of a directed graph for a deep learning recommendation engine was provided herein, the disclosed approaches can be beneficially applied to any directed graph having a portion which involves access requests to a large data structure with a variable latency followed by a portion which conducts computations on the responses to those access requests. Furthermore, while the example of embeddings was used herein as an example of a large data structure, many of the methods and systems disclosed herein are equally applicable to applications involving access requests using the indices of any large data structure in a computational architecture that cannot store the data table in a single level, or segment, or the architecture's memory hierarchy. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A method for executing a directed graph, wherein each step is conducted by at least one processor, comprising:
    receiving at least two batches of indices including a first batch and a second batch, wherein the at least two batches of indices, when used to access a set of embeddings: (i) provide at least two batches of embedding outputs which correspond to the at least two batches of indices; and (ii) execute a layer of the directed graph, wherein each index of the first batch is applied to the layer of the directed graph prior to each index of the second batch being applied to the layer of the directed graph;
    accessing the set of embeddings using the at least two batches of indices;
    rearranging, based on a set of latencies for the accessing step, the at least two batches of embedding outputs into at least two batches of rearranged embedding outputs including a first rearranged batch and a second rearranged batch; and
    providing the at least two batches of rearranged embedding outputs to a subsequent layer of the directed graph, wherein the first rearranged batch is entirely provided to the subsequent layer of the directed graph before the second rearranged batch is provided to the subsequent layer of the directed graph.

2. The method of claim 1, wherein:
    the accessing of the set of embeddings, using the at least two batches of indices executes the layer of the directed graph a number of times equal to a number of batches in the at least two batches of indices; and
    the providing of the at least two batches of rearranged embedding outputs to the subsequent layer of the directed graph is conducted as part of the execution of the directed graph the number of times.

3. The method of claim 1, wherein:
    the rearranging is based on the set of latencies in that the batches of rearranged embedding outputs are formed dynamically as individual entries in the set of embedding are accessed.

4. The method of claim 1, wherein:
    the directed graph is executed using a network of computational nodes;
    the at least one processor comprises at least one computational node in the network of computational nodes;
    the rearranging step is conducted by a first computational node in the network of computational nodes;
    the accessing step includes providing the rearranged embedding outputs to the first computational node;
    the set of latencies of the accessing step include a set of times for which the first computational node is waiting for the set of embedding outputs; and
    the rearranging is based on the set of latencies in that the batches of rearranged embedding outputs are formed dynamically as individual entries in the set of embedding outputs are provided to the first computational node.

5. The method of claim 1, wherein:
    the rearranging is based on the set of latencies using estimates of the latencies; and
    the estimates of the latencies are stored prior to the accessing the set of embeddings step.

6. The method of claim 1, wherein:
    the directed graph is a deep learning recommendation engine;
    the first batch in the at least two batches of indices includes at least two user-specific sets of indices;
    the subsequent layer of the directed graph is a neural network layer in the deep learning recommendation engine;
    the second batch in the at least two batches of rearranged embedding outputs includes at least two user-specific sets of embeddings; and
    a first set of users represented by the first batch is not the same as a second set of users represented by the second batch.

7. The method of claim 1, wherein:
    the batches in the at least two batches of indices include at least two inference-specific sets of indices;
    the batches in the at least two batches of rearranged embedding outputs include at least two inference-specific sets of embeddings; and
    a first set of inferences generated from the at least two inference-specific sets of indices is not equal to a second set of inferences generated from the at least two inference-specific sets of embeddings.

8. The method of claim 1, further comprising:
    receiving at least two batches of inferences from an output layer of the directed graph in response to the providing of the at least two batches of rearranged embedding outputs to the subsequent layer of the directed graph; and
    rearranging the at least two batches of inferences, based on an original composition of the at least two batches of indices, into at least two batches of rearranged inferences.

9. The method of claim 1, wherein:
    the directed graph is executed using a network of computational nodes;
    the network of computational nodes includes a first computational node and a second computational node;
    the at least two batches of indices are received at the first computational node;
    the rearranging step is conducted by the first computational node; and
    the accessing of the set of embeddings step is conducted using the first computational node and the second computational node.

10. The method of claim 9, wherein:
    the network of computational nodes is a network on chip for a multicore processor; and
    the computational nodes in the network of computational nodes are processor cores in the multicore processor.

11. The method of claim 10, wherein:
    the first computational node is an embedding look up orchestrator core;
    the providing and receiving steps are conducted by the first computational node using the network on chip; and
    the second computational node is an embedding cache core which stores embedding outputs in association with indices.

12. The method of claim 1, further comprising:
receiving at least two batches of inferences from an output layer of the directed graph in response to the providing of the at least two batches of rearranged embedding outputs to the subsequent layer of the directed graph;
wherein the directed graph is executed using a network of computational nodes;
wherein the at least two batches of indices are received at a first computational node in the network of computational nodes;
wherein the rearranging step and the receiving of the at least two batches of inferences step are conducted by the first computational node in the network of computational nodes; and
providing the at least two batches of inferences from the first computational node in the network of computational nodes to a different computational node in the network of computational nodes.

13. The method of claim 1, further comprising:
receiving at least two batches of inferences from an output layer of the directed graph in response to the providing of the at least two batches of rearranged embedding outputs to the subsequent layer of the directed graph;
rearranging the at least two batches of inferences, based on an original composition of the at least two batches of indices, into at least two batches of rearranged inferences;
wherein the directed graph is executed using a network of computational nodes;
wherein the accessing of the set of embeddings step is conducted at least partly using a second computational node in the network of computational nodes; and
providing the at least two batches of rearranged inferences from a first computational node to a third computational node in the network of computational nodes.

14. A system for executing a directed graph comprising:
a network of computational nodes;
a first computational node in the network of computational nodes;
a second computational node in the network of computational; and
non-transitory computer readable media, in the network of computational nodes, storing instructions which, when executed by the network of computational nodes, cause: (i) the first computational node to receive at least two batches of indices including a first batch and a second batch, wherein the at least two batches of indices, when used to access a set of embeddings: provide at least two batches of embedding outputs which correspond to the at least two batches of indices; and execute a layer of the directed graph, wherein each index of the first batch is applied to the layer of the directed graph prior to each index of the second batch being applied to the layer of the directed graph; (ii) the first computational node and the second computational node to cooperatively access the set of embeddings using the at least two batches of indices; (iii) the first computational node to rearrange, based on a set of latencies for the accessing step, the at least two batches of embedding outputs into at least two batches of rearranged embedding outputs including a first rearranged batch and a second rearranged batch; and (iv) the first computational node to provide the at least two batches of rearranged embedding outputs to a subsequent layer of the directed graph, wherein the first rearranged batch is entirely provided to the subsequent layer of the directed graph before the second rearranged batch is provided to the subsequent layer of the directed graph.

15. The system of claim 14, wherein:
the rearranging is based on the set of latencies in that the batches of rearranged embedding outputs are formed dynamically as individual entries in the batches of embedding outputs are provided by the network of computational nodes to the first computational node.

16. The system of claim 14, wherein:
the batches in the at least two batches of indices include at least two inference-specific sets of indices;
the batches in the at least two batches of rearranged embedding outputs include at least two inference-specific sets of embeddings; and
a first set of inferences generated from the at least two inference-specific sets of indices is not equal to a second set of inferences generated from the at least two inference-specific sets of embeddings.

17. The system of claim 14, wherein:
the network of computational nodes is a network on chip for a multicore processor; and
the computational nodes in the network of computational nodes are processor cores in the multicore processor.

18. The system of claim 14, wherein:
the first computational node is an embedding look up orchestrator core;
the providing and receiving steps are conducted by the first computational node using the network on chip; and
the second computational node is an embedding cache core which stores embeddings in association with indices.

19. A computer-implemented method for executing a directed graph comprising:
receiving at least two batches of indices including a first batch and a second batch, wherein the at least two batches of indices, when used to access a set of embeddings: (i) provide at least two batches of embedding outputs which correspond to the at least two batches of indices; and (ii) execute a layer of the directed graph, wherein each index of the first batch is applied to the layer of the directed graph prior to each index of the second batch being applied to the layer of the directed graph;
accessing the set of embeddings, using the at least two batches of indices, wherein accessing the set of embeddings includes individually providing a sequence of embedding outputs from a memory to a computational node;
rearranging, based on the sequence of embedding outputs, the at least two batches of embedding outputs into at least two batches of rearranged embedding outputs including a first rearranged batch and a second rearranged batch; and
providing the at least two batches of rearranged embedding outputs to a subsequent layer of the directed graph, wherein the first rearranged batch is entirely provided to the subsequent layer of the directed graph before the second rearranged batch is provided to the subsequent layer of the directed graph.

20. The computer-implemented method of claim 19, wherein:
the accessing of the set of embeddings, using the at least two batches of indices executes the layer of the directed graph a number of times equal to a number of batches in the at least two batches of indices; and the providing of the at least two batches of rearranged embedding outputs to the subsequent layer of the directed graph is conducted as part of the execution of the directed graph the number of times.

21. The computer-implemented method of claim 19, wherein:
the batches in the at least two batches of indices include at least two inference-specific sets of indices;
the batches in the at least two batches of rearranged embedding outputs include at least two inference-specific sets of embeddings; and
a first set of inferences generated from the at least two inference-specific sets of indices is not equal to a second set of inferences represented by the at least two inference-specific sets of embeddings.

* * * * *